United States Patent
Schmidt et al.

(10) Patent No.: US 6,674,412 B1
(45) Date of Patent: Jan. 6, 2004

(54) HOUSING OR PART THEREOF FOR DISTANCE SENSOR

(75) Inventors: Ewald Schmidt, Ludwigsburg (DE); Bernhard Lucas, Besigheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/070,880

(22) PCT Filed: Aug. 30, 2000

(86) PCT No.: PCT/DE00/02952
§ 371 (c)(1),
(2), (4) Date: Jul. 10, 2002

(87) PCT Pub. No.: WO01/18902
PCT Pub. Date: Mar. 15, 2001

(30) Foreign Application Priority Data

Sep. 3, 1999 (DE) .......................... 199 41 931

(51) Int. Cl.⁷ ............................... H01Q 1/42
(52) U.S. Cl. ................... 343/872; 343/713; 343/906; 342/70
(58) Field of Search .......................... 343/872, 700 MS, 343/906, 713, 711; 342/70, 71, 72; H01Q 1/42

(56) References Cited

U.S. PATENT DOCUMENTS 6,037,894 A * 3/2000 Pfizenmaier et al. .......... 342/70

2003/0128131 A1 * 7/2003 Skiver et al. ............ 340/815.4

FOREIGN PATENT DOCUMENTS

| DE | 44 12 770 | 10/1995 |
| DE | 195 30 065 | 1/1997 |
| DE | 196 21 075 | 2/1998 |
| DE | 196 44 164 | 4/1998 |
| DE | 197 12 098 | 5/1998 |
| DE | 197 03 095 | 6/1998 |

* cited by examiner

Primary Examiner—Hoanganh Le
(74) Attorney, Agent, or Firm—Kenyon & Kenyon

(57) ABSTRACT

A housing or housing part for a distance sensor, e.g., for motor vehicles, having at least one first housing part into which at least one member transparent to the sensor radiation for focusing the sensor radiation and/or at least one radome without intended focusing is/are integrated in the main radiation direction of the distance sensor. The housing or housing part has at least one second housing part into which at least one base plate having antenna elements is installed orthogonally to the main radiation direction of the distance sensor. A connecting line between the first housing part and the second housing part extends in a region between the base plate and the member transparent to the sensor radiation, and/or the radome. At least one plug connector is provided for electrical connection of the distance sensor to the motor vehicle. The connecting line is located in the region of the plug connector of the distance sensor, and is aligned co-axially to the main radiation direction of the distance sensor.

14 Claims, 2 Drawing Sheets

HOUSING OR PART THEREOF FOR DISTANCE SENSOR

FIELD OF THE INVENTION

The present invention relates to a housing or a housing part for a distance sensor for motor vehicle which may be used, for example, within the framework of a precrash-detection device or an adaptive cruise control (ACC).

BACKGROUND INFORMATION

German Published Patent Application No. 197 03 095 describes a housing or housing part for a microwave transmitting- and/or receiving device, particularly for a motor-vehicle radar system. The housing is made of an upper housing part which forms a cover, and a lower housing part. The upper housing part has a circumferential U-shaped groove and a circumferential U-shaped rim. A flange of a stepped antenna lens grips on the one side into the circumferential U-shaped groove and is fixed in position on the other side by a snap element on the circumferential U-shaped rim. Electronic circuits can be accommodated in the lower housing part. The two housing parts (upper housing part and lower housing part) are connected to one another by a known construction, a seal for providing that the housing is protected on the whole from the penetration of moisture and dirt.

German Published Patent Application No. 197 12 098 describes a housing for a radar sensor which can be integrated into body parts of the motor vehicle. For example, the possibility is described of integration into the bumper of a motor vehicle, the bumper being made of a plastic which is transmitting for microwaves. The lens-shaped antenna for focusing the radar beams is produced from the same material as the bumper and is integrated completely in one piece.

German Published Patent Application No. 195 30 065 describes a monostatic FMCW (frequency modulated continuous wave) radar sensor for a vehicle, which may be used for detecting objects. The pot-shaped lower housing part is hermetically sealed in the beam direction by a dielectric lens designed both for sending and for receiving a corresponding echo signal. A pressure-equalizing element is arranged at a suitable location of the wall, at the periphery or at the bottom of the housing. Arranged near the bottom of the lower housing part is a base plate having an evaluation circuit which evaluates the transmitted and received signals. Provided below the evaluation circuit is a connection plane via which the corresponding signals are brought outwards to connectors or lines (not shown).

German Published Patent Application No. 44 12 770 describes a microwave lens antenna arrangement for a motor-vehicle proximity radar warning system. The pot-shaped housing described is sealed in the beam direction by a stepped dielectric lens and/or a low-loss radome window. An example of a structural design having an integrated lens antenna arrangement provides for a cuboidal metal housing that is covered at its front end (in the beam direction) by a lens. For example, the lens may be put on as a cover using snap fasteners. Cast integrally at a side wall in a small connection box are plug pins, to which the power supply for the electronic circuit elements in the housing, and lines for transmitting information from the housing to an external computer in the motor vehicle, can be connected.

From German Published Patent Application No. 196 44 164, a motor-vehicle radar system is known in which, for protection against weather influences and preferably also for focusing, a dielectric member is situated in the ray trajectory of the electromagnetic waves. The dielectric member has an arrangement of electrically conductive tracks by which the dielectric member can be heated to, for example, free it from coatings of ice, snow or moisture. Furthermore, the electrically conductive tracks can be used for measuring the attenuation by a possible coating on the dielectric member and for checking the functioning of the radar system by a target simulation.

German Patent No. 196 21 075 describes a housing for a distance-measuring device in a motor vehicle. The housing contains a transmitter and receiver of radar radiation, and has an opening, provided with a lens, for the radar radiation. In this case, the box-shaped cover part of the housing and the lens are constructed in one piece and are produced from one and the same material which is transmitting for the radar radiation and which influences its ray trajectory. However, the material is opaque to electromagnetic radiation in the visible range. The cover part is slipped onto a lower housing part and joined imperviously to it by a circumferential seal lying in one plane. The energy supply and the signal exchange of the circuit arrangement, disposed in the housing, with the motor vehicle, is effected via a plug connector in the lower housing part. In addition, the patent describes the possibility of equalizing pressure with the surrounding atmosphere using a sealing pill.

SUMMARY

It is an object of the present invention to provide a housing or a housing part for a distance sensor which is inexpensive to produce, simple to install and which is optimized with respect to the mounting dimensions.

This objective is achieved by a housing or housing part for a distance sensor, e,.g., for motor vehicles, having at least one first housing part into which at least one member, transparent to the sensor radiation, for focusing the sensor radiation and/or at least one radome without intended focusing is/are integrated in the main radiation direction of the distance sensor. The housing or housing part has at least one second housing part into which at least one base plate having antenna radiating elements is able to be installed orthogonally to the main radiation direction of the distance sensor. The connecting line between the first housing part and the second housing part extends in a region between the base plate and the member transparent to the sensor radiation, and/or the radome. At least one plug connector is provided via which an electrical connection between the distance sensor and the motor vehicle may be made. The connecting line is located in the region of a plug connector of the distance sensor, and the plug connector is aligned co-axially to the main radiation direction of the distance sensor. With respect to production costs, this arrangement offers the advantage that a member, transparent to the sensor radiation, for focusing the sensor radiation and/or at least one radome without intended focusing is/are integrated into the first housing part, and thus importantly, the housing of the distance sensor is made of only two housing parts. In addition, this small number of housing parts offers the advantage of simple assembly. With respect to the mounting dimensions, the alignment of the plug connector co-axially to the main radiation direction of the distance sensor may be advantageous, since the height of the housing is thereby decisively only dependent on the antenna elements and the quasi-optical properties of the antenna lens and of the member transparent to the sensor radiation. The plug connector may be arranged opposite to the main driving direction of the motor vehicle, i.e. opposite to the main radiation direction of the distance sensor, since in this arrangement the plug connector and the connector contacts are protected from soiling.

At least the side of the plug connector within the housing may be surrounded by the first housing part. This arrangement may provide the advantage that the side of the plug connector within the housing is freely accessible in a particularly suitable manner as long as the first housing part is not yet mounted.

According to one example embodiment of the housing or of the housing part, at least one device for equalizing pressure between the interior of the housing and the surroundings is disposed in the first housing part in the region of the plug connector. Due to this device for pressure compensation, it is possible to hermetically seal off the remainder of the housing in an advantageous manner, since a possible pressure equalization which, for example, could be necessary because of the heating of components within the housing, can be offset by the pressure-equalization element. An overpressure or underpressure arising in the interior of the housing in relation to the surroundings is thereby prevented.

The first housing part may be fixed to the second housing part at the connecting line by a groove and tongue joint and by lockable fixing devices. This combination of groove and tongue joint and of lockable fixing devices demonstrates a hermetically impervious and long-lastingly durable arrangement.

The first housing part and a covering layer of the member transparent to the sensor radiation may be made of one piece and are produced of the same material. This arrangement may offer the advantage that the first housing part has a completely homogenous surface on the outside, and thus is able to withstand the influences of weather in a particularly suitable manner.

A material from at least one of the following product groups may be used as material: polyether imide, polyphenylene oxide or polyamide.

The first housing part, the covering layer and the member transparent to the sensor radiation may be produced in a multi-step injection-molding process. This arrangement may provide an advantageous effect on the production costs, as well as on the degree of production complexity.

In addition to the antenna elements, at least one internal subassembly may be arranged on the base plate. The base plate, necessary in any case for the antenna elements, may be additionally utilized for the arrangement of at least one internal subassembly. In this manner, it is possible to integrate components within the housing, which may be advantageous for the overall size of the distance sensor.

The height of the second housing part may be dimensioned such that it corresponds at least to the height of the internal subassembly on the base plate. The internal subassembly and the antenna elements are thereby surrounded in a cup-shaped manner by the second housing part. In this context, the overriding physical criterion is that the focal distance between the antenna elements and the member transparent to the sensor radiation and/or the radome is taken into account. When laying out the internal subassembly, care is taken that the ray trajectory of the sensor radiation is not influenced.

In one example embodiment of the housing according to the present invention, the plug connector is releasably inserted into the second housing part, and a sealing device is provided between the plug connector and the second housing part. A hermetically impervious seal is thereby ensured between the second housing part and the plug connector. The particular flexibility of the housing is maintained, since if desired, a differently configured plug connector may be used, for example, in the application to different vehicle types.

The member transparent to the sensor radiation may be a dielectric lens. Such a dielectric lens focuses the sensor radiation emitted from the antenna elements. In addition, electrically conductive tracks may be embedded in the member transparent to the sensor radiation. With the aid of the electrically conductive tracks, it is possible to protect the distance sensor from the influence of weather. To that end, an electric power may be used to heat the electrically conductive tracks, and thus indirectly heat the surface of the first housing part. Therefore, a coating of snow or ice on the surface of the first housing part may be melted, and the surface dried during subsequent further heating.

DETAILED DESCRIPTION

Figure 1:
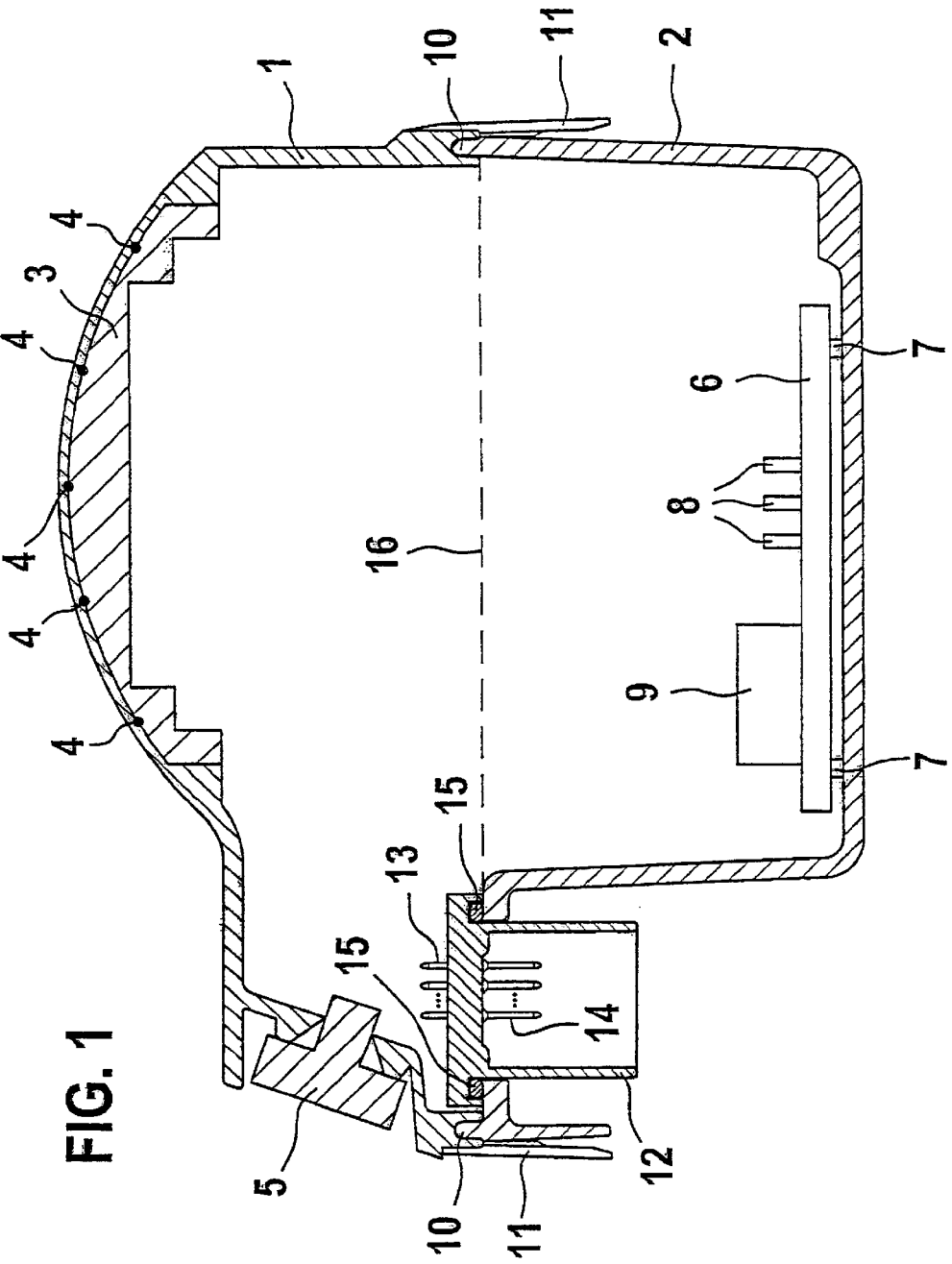
FIG. 1 is a cross-sectional view of a housing according to the present invention.

FIG. 1 illustrates a housing according to the present invention as it may be used for a distance sensor within the framework of an adaptive cruise control system in a motor vehicle. The cross-sectional view of FIG. 1 illustrates a first housing part 1 and a second housing part 2. Integrated into first housing part 1 is a dielectric lens 3 on whose surface, in turn, electrically conductive tracks 4 are embedded. Furthermore, a pressure-equalization element 5, which is used for pressure compensation between the interior of the housing and the surroundings, is inserted into first housing part 1. In second housing part 2, arranged orthogonally to the main radiation direction of the distance sensor, is a base plate 6 which is fixed to second housing part 2 by mountings 7. Antenna radiating elements 8 and internal subassemblies 9 are disposed on base plate 6. In this example embodiment, the number of antenna elements is assumed as three, which, however, is not intended to denote any restriction on the number of antenna elements that may be used in the context of the present invention. Thus, the arrangement of fewer or more than three antenna elements is also possible. First housing part 1 and second housing part 2 are joined to one another by a groove and tongue joint 10. In addition to groove and tongue joint 10, lockable fixing devices 11, which in this example embodiment are configured as clips 11, are provided for fixing the connection between first housing part 1 and second housing part 2 in place. One example embodiment of such clips 11 is explained in greater detail within the framework of the following FIG. 2. A plug connector 12 is inserted into second housing part 2. This plug connector 12 has contacts 13 to the interior of the housing, and contacts 14 which extend outside of the housing. For example, plug connector 12 may be connected to second housing part 2 by a snap-in connection. A sealing device 15 is provided between plug connector 12 and second housing part 2 for sealing the housing.

As illustrated in FIG. 1, it is clearly discernible that the side of plug connector 12 within the housing, i.e., contacts 13 to the interior of the housing, are surrounded by first housing part 1. External contacts 14 of plug connector 12, on the other hand, are arranged in the region of second housing part 2.

Numeral 16 designates a virtual connecting line between first housing part 1 and second housing part 2. Plug connector 12 is used to electrically connect the distance sensor to the motor vehicle, and is aligned at the height of connecting line 16 co-axially to the main radiation direction of the distance sensor. The main radiation direction of the distance sensor is the direction starting from antenna elements 8 perpendicular to ground plate 6, which passes through dielectric lens 3.

Pressure-equalization element 5, integrated into first housing part 1 and situated in the vicinity of plug connector 12 in first housing part 1, may be constructed in a form familiar to one skilled in the art, for example, as a pressure pill.

In this example embodiment, first housing part 1 and the covering layer of dielectric lens 3 are produced of one piece and of the same material. Presenting themselves as material for this purpose are, first of all, materials from the product group: polyether imide, polyethylene oxide or polyamide. In this context, other suitable materials for manufacturing first housing part 1 and the covering layer 3 may be used. First housing part 1, the covering layer and dielectric lens 3 having embedded electrically conductive tracks 4 may be produced in a multi-step injection-molding process. First housing part 1, together with integrated dielectric lens 3 and electrically conductive tracks 4 may be produced in a multi-step injection-molding process in such a way that, first of all, a substructure of dielectric lens 3 is produced as a plastic injection-molded part. This substructure is provided with grooves into which electrically conductive tracks 4 may be embedded. This ready-fabricated substructure may be extrusion coated in a further injection-molding operation in such a way that both the layer covering the electrically conductive tracks is formed, as well as the covering layer and the remainder of first housing part 1. Plastics, such as polyether imide, which exhibit the mechanical and electrical properties desired for the later use, may be suitable as injection-molding material. In addition, this multi-step injection-molding process may provide the advantage that uniform wall thicknesses are producible which are relevant for the microwave-specific geometry.

In this example embodiment, second housing part 2 is dimensioned such that the height corresponds at least to the height of internal subassembly 9 on base plate 8. In other words, base plate 6, together with the components thereon, is completely enclosed by cup-like second housing part 2. The volumes of first housing part 1 and of second housing part 2 in this example embodiment are, for example, in a relationship of 1 to 1.5, to 1.5 to 1. However, in dimensioning the housing measurements, the focal distance between the antenna elements and the member, transparent to the sensor radiation, and/or the radome may be selected in accordance with the physical requirements. Furthermore, when laying out the internal subassembly, care may be taken that the ray trajectory of the sensor radiation is not influenced.

Figure 2:
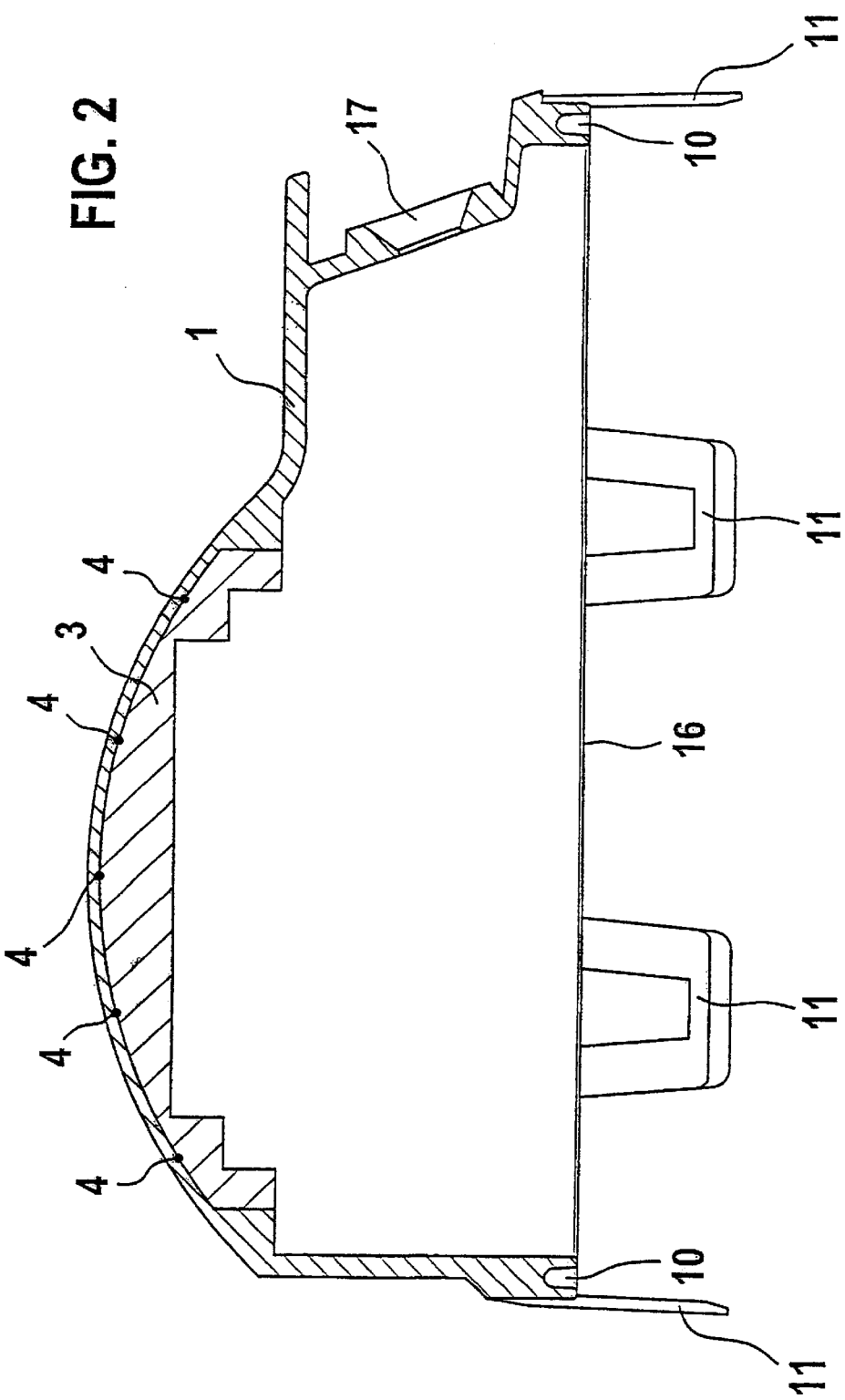
FIG. 2 is a cross-sectional view of a first housing part according to the present invention.

FIG. 2 illustrates a first housing part 1 in a mirror view with respect to the representation illustrated in FIG. 1. A dielectric lens 3 having electrically conductive tracks 4 is again integrated into first housing part 1. In contrast to the representation illustrated in FIG. 1, in this representation illustrated in FIG. 2, no pressure-equalization element is inserted into first housing part 1. At the location at which a possible pressure-equalization element may be inserted, in this representation, a lead-through 17 is drawn in. Virtual connecting line 16, which symbolizes the junction to second housing part 2, forms the lower termination of first housing part 1 illustrated in FIG. 2.

The depiction according to FIG. 2 illustrates the mechanical connection between first housing part 1 and second housing part 2. In the depiction according to FIG. 2, groove and tongue joint 10 and lockable fixing devices 11 are discernible. In this example embodiment, lockable fixing devices 11 are clip elements, although other attachment arrangements may be used that are space-saving, inexpensive, easy to produce and, in particular, reliable.

Dielectric lens 3 illustrated in both FIGS. 1 and 2 may be replaced by a radome without intended focusing, or a different member, transparent to the sensor radiation, for focusing the sensor beam. In this context, a radome may also be used for the adaptation. In the same manner, given appropriate selection of material, the coating of first housing part 1 located in the region of dielectric lens 3 may be used for the adaptation. In addition, further components or internal subassemblies may be arranged within the housing. Furthermore, holding devices may be provided which are used to join the distance sensor mechanically to the motor vehicle. An electrical contacting between electrically conductive tracks 4 and internal subassemblies 9, or any other control/power supply necessary for the functioning of electrically conductive tracks 4, may be provided. For example, second housing part 2 may be made of the same material as first housing part 1, or else, e.g., of a material opaque to the sensor radiation, such as aluminum or aluminum die cast metal. Optionally, pressure-equalization element 5 may be integrated into the second housing part.

The example embodiment of the distance sensor illustrated is an FMCW radar having three antenna elements 8 and a dielectric lens 3. However, it is within the scope of the invention to vary the number of antenna elements 8 and to use other than the FMCW radar process indicated.

What is claimed is:

1. A housing or housing part for a distance sensor, comprising:
   at least one first housing part including at least one of:
      at least one member transparent to sensor radiation configured to focus the sensor radiation integrated in a main radiation direction of the distance sensor; and
      at least one radome without intended focusing integrated in the main radiation direction of the distance sensor;
   at least one second housing part including at least one base plate having antenna elements, the base plate installed orthogonally to the main radiation direction of the distance sensor;
   a connecting line between the first housing part and the second housing part extending in a region between the base plate and the at least one of the member transparent to sensor radiation and the radome; and
   at least one plug connector having a first side and a second side including electrical connections;
   wherein the connecting line is located in a region of the plug connector of the distance sensor, and the plug connector is aligned co-axially to the main radiation direction of the distance sensor.

2. The housing or housing part of claim 1, wherein the electrical connections of the plug connector are configured to provide electrical connections between the distance sensor and a motor vehicle.

3. The housing or housing part of claim 1, wherein the first side of the plug connector is within the housing or housing part and is enclosed by the at least one first housing part.

4. The housing or housing part of claim 1, further comprising at least one pressure equalizing device configured to equalize pressure between an interior and an exterior of the housing or housing part, the pressure equalizing device located in the at least one first housing part in the region of the plug connector.

5. The housing or housing part of claim 1, further comprising:
   a groove and tongue joint; and
   lockable fixing devices;
   wherein the first housing part is fixed to the second housing part along the connecting line by the groove and tongue joint and the lockable fixing devices.

6. The housing or housing part of claim 1, wherein the member transparent to sensor radiation includes a covering layer, and the first housing part and the covering layer are made of one piece and of the same material.

7. The housing or housing part of claim 6, wherein the material includes at least one of polyether imide, polyphenylene oxide and polyamide.

8. The housing or housing part of claim 6, wherein the first housing part, the covering layer and the member transparent to sensor radiation are produced in one multi-step injection-molding process.

9. The housing or housing part of claim 1, further comprising at least one internal subassembly arranged on the base plate with the antenna elements.

10. The housing or housing part of claim 9, wherein a height of the second housing part is greater than or equal to a height of the internal subassembly on the base plate.

11. The housing or housing part of claim 1, further comprising a sealing device arranged between the plug connector and the second housing part, the plug connector releasably inserted into the second housing part.

12. The housing or housing part of claim 1, wherein the member transparent to sensor radiation includes a dielectric lens.

13. The housing or housing part of claim 1, further comprising electrically conductive tracks embedded in the member transparent to sensor radiation.

14. The housing or housing part of claim 1, wherein the plug connector is aligned opposite to the main radiation direction of the distance sensor.

* * * * *